8657X
W. Ellis,
Vegetable Washer.
Patented Feb. 25, 1835.
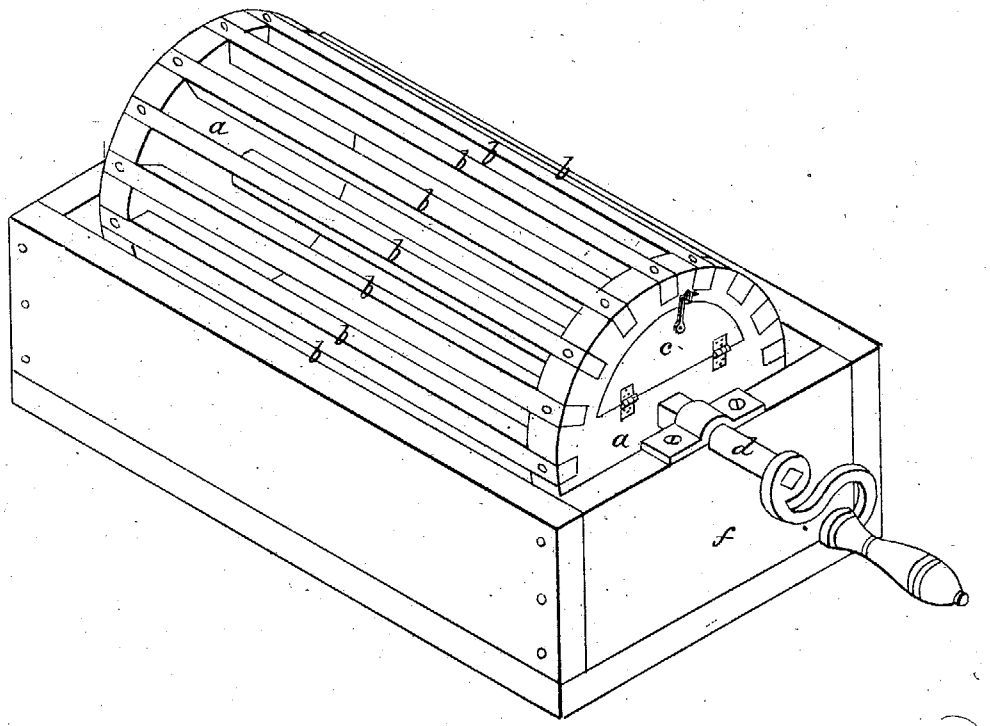

8651X

Feb. 25. 1835

William Ellis, of Waterville, State of Maine

Letters Patent

The schedule referred to in these Letters Patent, and making a part of the same containing a description in the words of the said William Ellis himself of his improvement in a machine for washing patatoes, roots, &c.

To all to whom these presents shall come
Be it known that I William Ellis of Waterville in the County of Kennebeck and State of Maine have invented a new and useful improvement in a machine for washing potatoes roots &c and that the following is a full and exact description of the construction and use of the said machine as invented by me, A hollow cylinder is to be constructed in the following manner — Two end pieces or heads are to be provided of a circular form & say about one foot in diameter, these are to be connected together by wooden bars set all round the circumference at such regular distances as may be proper for the kind or size of roots to be washed, the object being to return them in this hollow cylinder, or cage so that they may not pass out between the bars, A segment or portion of each of these heads is to be cut through of equal size on each head so as to be removed, this is made moveable by hinges on one head and secured to the other by a hook or fastening and in this manner forms a door by which the cylinder may be either filled or emptied Through the centre of this cylinder from one head to the other an axle is to pass and to be secured to each, and each end is to be formed into a journal or round shoulder, from one of which there is to project a handle or crank, for the purpose of giving motion to the cylinder, — Beneath this cylinder a box or trough is to be placed water tight of sufficient depth to

8651X admit the cylinder so that it may be hung upon the top of the sides to work or revolve in the centre thereof upon the journal of the axle This is the construction or mode of building my machine; the manner of using it is as follows. The door of the cylinder being opened, the roots are poured in and it is then secured down again, Water is also poured into the tub and then the handle being turned the cylinder commences to revolve and carry the roots through the water, thereby turning them over repeatedly and so subjecting them to the action of the water as to cleanse them, the dirty water being poured off a fresh supply is added and the operation [illegible] until the roots are found perfectly clean when they are discharged from the cylinder and others put in

What I claim as my invention and not before known in the above described machine is the application and construction of the cylinder as set forth and the adapting the trough beneath it to the use as also set forth.

In testimony that the above is a full and exact description of the construction and mode of applying the principle thereof in my machine, I have hereunto set my hand this tenth day of February in the year eighteen hundred and thirty five William Ellis Witness
C H W Wharton
Henry Stone (Drawing)

Ex^d M.C.

(750 words)